United States Patent
Yoshimoto et al.

(10) Patent No.: US 9,988,300 B2
(45) Date of Patent: Jun. 5, 2018

(54) OPTICAL GLASS, OPTICAL ELEMENT USING OPTICAL GLASS, AND OPTICAL DEVICE

(71) Applicant: NIKON CORPORATION, Tokyo (JP)

(72) Inventors: Kohei Yoshimoto, Kawasaki (JP); Hiroshi Yamamoto, Yamato (JP)

(73) Assignee: NIKON CORPORATION, Tokyo (JP)

( * ) Notice: Subject to any disclaimer, the term of this patent is extended or adjusted under 35 U.S.C. 154(b) by 0 days. days.

(21) Appl. No.: 15/428,691

(22) Filed: Feb. 9, 2017

(65) Prior Publication Data

US 2017/0152172 A1 Jun. 1, 2017

Related U.S. Application Data

(63) Continuation of application No. PCT/JP2015/070674, filed on Jul. 21, 2015.

(30) Foreign Application Priority Data

Sep. 5, 2014 (JP) ................................. 2014-181697

(51) Int. Cl.
*C03C 3/19* (2006.01)
*G02B 1/00* (2006.01)

(52) U.S. Cl.
CPC . *C03C 3/19* (2013.01); *G02B 1/00* (2013.01)

(58) Field of Classification Search
CPC ....................................................... C03C 3/19
See application file for complete search history.

(56) References Cited

U.S. PATENT DOCUMENTS

| | | | | |
|---|---|---|---|---|
| 7,419,923 B2 * | 9/2008 | Mori | ......................... | C03C 3/19 501/47 |
| 7,598,189 B2 * | 10/2009 | Fujiwara | ................. | C03B 11/08 501/47 |
| 7,799,714 B2 * | 9/2010 | Fujiwara | ................. | C03B 11/12 501/45 |
| 2005/0231838 A1 | 10/2005 | Mori et al. | | |
| 2006/0150682 A1 | 7/2006 | Fujiwara et al. | | |
| 2007/0111875 A1 * | 5/2007 | Fujiwara | ................. | C03B 11/12 501/47 |
| 2009/0325774 A1 | 12/2009 | Ikenishi | | |

FOREIGN PATENT DOCUMENTS

| | | |
|---|---|---|
| JP | 2000-72474 | 3/2000 |
| JP | 2002-211949 | 7/2002 |
| JP | 2006-52119 | 2/2006 |
| JP | 2014-227336 | 12/2014 |
| JP | 2014227336 | * 12/2014 |
| WO | WO 03/072518 A1 | 9/2003 |

OTHER PUBLICATIONS

International Search Report dated Oct. 13, 2015, in corresponding International Patent Application No. PCT/JP2015/070674.
English translation of Written Opinion for PCT/JP2015/070674 dated Oct. 13, 2015.
European Search Report for European Application No. 15838673.0 dated Mar. 16, 2018.

* cited by examiner

*Primary Examiner* — Karl E Group

(57) ABSTRACT

An optical glass which is suitable for mold press molding. The optical glass contains, in weight %, 10-25% of $B_2O_3$, 30-60% of $P_2O_5$, 0-5% of $Al_2O_3$, 0.1-10% of $Li_2O$, 0-15% of SrO, 10-50% of BaO, 0-12% of ZnO, 0-5% of $Y_2O_3$ and 0-5% of $Gd_2O_3$, while not containing $La_2O_3$.

8 Claims, No Drawings

OPTICAL GLASS, OPTICAL ELEMENT USING OPTICAL GLASS, AND OPTICAL DEVICE

CROSS-REFERENCE TO RELATED APPLICATIONS

This application is a § 111(a) continuation application, which claims the benefit under 35 U.S.C. § 371 of PCT International Patent Application No. PCT/JP2015/070674, filed Jul. 21, 2015, which claims the foreign priority benefit under 35 U.S.C. § 119 of Japanese Patent Application No. 2014-181697, filed Sep. 5, 2014, the contents of which are incorporated herein by reference.

FIELD OF INVENTION

The present invention relates to optical glass which is suitable for mold press molding.

BACKGROUND ART

Recently, various imaging instruments are developed, and optical glass constituting lenses suitable for them also has been investigated. Especially, amid downsizing, weight saving and cost-reducing of optical instruments including digital cameras, aspheric lenses permitted aberration correction with fewer lenses are growing in importance.

However, there was a conventional problem for aspheric lenses to have difficulty in performing polishing processes because of their complicated shapes. Thus, processes called mold press molding have been employed, in which glass materials (preforms) are poured into a mold and heated, and pressed after softening.

However, since in mold press molding, preforms are treated after softening, quality control and manufacturing thereof become more difficult as the glass-transition temperature (Tg) of raw materials are higher. Specifically, degradation of a mold, prolongation of processing time and the like are included in the problem. Further, recently, hot-molding of preforms (technology for molding in a direct way by casting melted glass into a mold) is also employed. In such a hot-molding, in case that the liquid phase temperature (Tl) of glass is high, devitrification tend to occur during molding, and therefore, manufacturing of preforms becomes difficult. Thus, glass that have a relatively low glass-transition temperature or a relatively low liquid phase temperature is usually used as optical glass for mold press molding like this.

For example, in patent document 1, optical glass for mold press molding is described. However, since conventional optical glass contains a large amount of ZnO, in order to reduce the glass-transition temperature, it is not sufficient concerning low dispersibility which is important for chromatic aberration correction.

PRIOR ART DOCUMENTS

Patent document 1: Japanese Unexamined Patent Publication No. 2000-072474

SUMMARY OF THE INVENTION

Problems to be Resolved by the Invention

Therefore, the present invention provides optical glass which is suitable for mold press molding.

Means of Solving the Problems

The first aspect of the present invention is optical glass which contains, in weight %, 10-25% of $B_2O_3$, 30-60% of $P_2O_5$, 0-5% of $Al_2O_3$, 0.1-10% of $Li_2O$, 0-15% of SrO, 10-50% of BaO, 0-12% of ZnO, 0-5% of $Y_2O_3$ and 0-5% of $Gd_2O_3$, respectively, while does not contain $La_2O_3$.

The second aspect of the present invention is an optical element used the optical glass according to the first aspect.

The third aspect of the present invention is an optical device equipped with the optical element according to the second aspect.

EMBODIMENT FOR CARRYING OUT THE INVENTION

This embodiment is optical glass having optical constants with the moderate refractive index and the low dispersion, as well as the glass-transition temperature (Tg) and the liquid phase temperature (Tl) which are suitable for mold press molding, and being excellent in devitrification resistance in phosphate glass.

The composition ranges and property ranges of each component of the glass according to the embodiment are as follows. Incidentally, unless otherwise stated herein, all of the contents of each component shall be in weight % of the oxide conversion composition relative to the total weight of the glass. As well, it is presumed that all of the oxides, the combined salts and the like used as raw materials of the glass structural components of the present invention are degradated completely to converse into oxides while they are melting, in this context, the oxide conversion composition is the one which is represented each component included the glass based on the total weight of the oxide in 100 weight %.

$B_2O_3$ is an essential component as a glass forming oxide, and it has effects of providing low dispersibility and enhancing meltability. In case that it is equal to or less than 10%, the desired dispersibility does not obtain, and meltability of the glass also becomes worse. On the other hand, since, in case that it is more than 25%, the glass-transition temperature is increased, the dispersion is also more likely to increase, the range of 10-25% is preferable. The range of 10-20% is more preferable, and the range of 10-15% is most preferable.

$P_2O_5$ is an essential component as a glass forming oxide, and it has effects of reducing the glass-transition temperature and the liquid phase temperature, and providing low dispersibility. However, in case that it is less than 30%, it is difficult to obtain stable glass, and in case that it is equal to or more than 60%, it is difficult to obtain the targeted refractive index. Therefore, the range of 30-60% is preferable. The range of 35-50% is more preferable, and the range of 40-47% is most preferable.

$Al_2O_3$ is an active component for enhancing chemical durability. However, in case that it is introduced excessively, not only decreasing fusibility or devitrification resistance, but also low dispersibility is lost. Therefore, the range of 0-5% is preferable. The range of 0-4% is more preferable, and the range of 0-3% is most preferable.

$Li_2O$ is an essential component of the embodiment, it particularly has effects of enhancing fusibility of glass, and reducing the glass-transition temperature and the liquid phase temperature. However, since, in case that it is more than 10%, devitrification resistance is decreased and it becomes difficult to obtain stable glass, the introduction amount thereof is set in the range of 0.1-10%. The range of 1-8% is more preferable, and the range of 2-6% is most preferable.

MgO and CaO are useful components for regulating the refractive index, but since, in case that the introduction amount of them is excessive, the glass-transition temperature is increased, the individual amounts of them set in the range of 0-4% is desirable and the total introduction amount of them set in the range of 0-4% is also desirable.

SrO is an active component for increasing the refractive index of glass, but since elevation of the liquid phase temperature is caused by introduction of an excessive amount thereof, the introduction amount thereof is set in the range of 0-15%. The range of 1-12% is more preferable, and the range of 3-9% is most preferable.

BaO is an essential component of the embodiment, and it is an important component for increasing the refractive index of glass, reducing the liquid phase temperature and enhancing devitrification resistance. In case that it is equal to or less than 10%, the effects described above are not sufficient, and in case that it is more than 50%, it possibly lose low dispersibility and also increase the glass-transition temperature, and thus, the suitable range is set in 10-50%. The range of 15-40% is more preferable, and the range of 20-35% is most preferable.

$Na_2O$ and $K_2O$ provide the same effects as $Li_2O$, but in case that they are introduced excessively, it becomes difficult to obtain the targeted refractive index, due to decreasing the refractive index. Therefore, concerning $Na_2O$ and $K_2O$, the individual introduction amounts are set in the range of 0-8%. The range of 0-4% is more preferable, and the range of 0-3% is most preferable.

ZnO has effects of increasing the refractive index and reducing the glass-transition temperature, but simultaneously the component increases dispersion, and thus, the additive amount thereof is set in the range of 0-12%. The range of 0-5% is more preferable, and the range of 0-3% is most preferable.

$Y_2O_3$ and $Gd_2O_3$ are more effective than SrO or BaO concerning the effect of increasing the refractive index, but, since in case that the introduction amount of them is excessive, the liquid phase temperature is increased rapidly and glass is tended to devitrify, the individual introduction amounts of them is set in the range of 0-5%, and the total amount of them is also set in the range of 0-5%. The individual amounts of them or the total amount of them set in the range of 0-4% is more preferable, and in the range of 0-3% is still more preferable.

Further, $La_2O_3$ has the same effect of increasing the refractive index as $Y_2O_3$ and $Gd_2O_3$, but since it has an prominent effect of increasing the liquid phase temperature, it is desirable not to introduce it.

Incidentally, $Sb_2O_3$ may be charged as a de-bubbling agent, in order to de-bubble glass. The amount thereof may be set in the range of 0-1%. Further, not only above components, other components may be also added as long as the effects of the optical glass of the embodiment can be obtained.

Next, material values of the optical glass according to the embodiment will be described.

In view of thinning of lenses, the glass of the embodiment is desired to have the high refractive index (the refractive index (nd) is large). However, in general, in case that the refractive index increases, the Abbe's number tends to decrease. Therefore, in the glass of the embodiment, the refractive index (nd) is set in the range of 1.56-1.61, in which the lower limit is 1.56, and the upper limit is 1.61.

In view of chromatic aberration correction of lenses, the glass of the embodiment is desired to have low dispersibility (the Abbe's number (vd) is large). However, in general, in case that the Abbe's number is large, the refractive index tends to decrease. Further, fluorine is sometimes added, in order to obtain glass having the Abbe's number which is more than 70, but addition of highly volatile fluorine is subject to change in the composition due to volatility thereof, and therefore, it becomes difficult to maintain the quality of glass. Therefore, in the glass of the embodiment, the Abbe's number (vd) is set in the range of 63-70, in which the lower limit is 63, and the upper limit is 70.

In view of mold press molding, in the glass of the embodiment, the glass-transition temperature (Tg) is desired to be low. The low glass-transition temperature (Tg) brings in effects of an easiness on glass-molding, a degradation control of molds and the like. Therefore, in the glass of the embodiment, the glass-transition temperature (Tg) is equal to or less than 530° C.

On the one hand, in view of hot-molding of preforms, in the glass of the embodiment, the liquid phase temperature (Tl) is desired to be low. The low liquid phase temperature (Tl) makes glass harder to occur devitrification, and thus, it enhances moldability, when preforms are directly molded from melted glass. Therefore, in the glass of the embodiment, the liquid phase temperature (Tl) is equal to or less than 1000° C.

In view of weight saving, in the glass of the embodiment, the specific gravity is desired to be light. Therefore, in the glass of the embodiment, the specific gravity is set in equal to or less than 3.5.

The glass according to the embodiment is preferred as an optical element for a lens and the like which is equipped into an optical device such as a camera, a microscope and the like.

EXAMPLE

Next, examples and comparative examples of the present invention will be described. Table 1-Table 5 show compositions of the optical glass according to examples of the present invention, and Tables 6-8 show compositions of the optical glass according to comparative examples of the present invention, together with measured results of the refractive index (nd), the Abbe's number (vd), the glass-transition temperature (Tg), the liquid phase temperature (Tl), the specific gravity (Sg), and evaluations of devitrification resistance. Incidentally, the present invention is not limited to these examples.

<Manufacturing of the Optical Glass>

The optical glass according to the examples and comparative examples of the present invention were manufactured by the following procedure. First, glass raw materials such as oxides, hydroxides, phosphate compounds (such as phosphate and orthophosphoric acid), carbonates, and nitrate were weighed, so as to be chemical compositions (weight %) described in Tables 1-8. Next, the weighed raw materials were mixed, putted into a platinum crucible, melted at the temperature of 1150-1250° C. for about 1 hour, and homogenized with stirring. Then, after the temperature was appropriately lowered, it was casted into a mold and the like, and left with cooling to obtain each sample.

<Measurement of the Optical Glass>

(1) Refractive index (nd) and Abbe's number (vd)

The refractive indexes (nd) and the Abbe's numbers (vd) of each sample described in Tables 1-8 were measured and calculated using the refractive index measuring instrument (manufactured by Kalneur Optical Industry Corporation; "KPR-200"). Incidentally, the refractive index value was rounded to five decimal places.

(2) Glass-Transition Temperature (Tg)

The glass-transition temperatures (Tg) of each sample described in Tables 1-8 were determined by DTA curves measured at 10° C./min of the increase rate in temperature using the differential thermal/thermogravimetric simultaneous measurement device (manufactured by Bruker Corporation; "TG-DTA2000SA").

(3) Liquid phase temperature (Tl)

After the glass was held for 18 minutes in an experimental furnace of devitrification with temperature gradient in the range of 700-1100° C., and then the presence or absence of crystallization was observed using a microscope at 100-fold magnification, the liquid phase temperatures (Tl) of each sample described in Tables 1-8 were set at the lowest temperature which did not occur devitrification seen from the high-temperature.

(4) Specific Gravity (Sg)

The specific gravities (Sg) of each sample described in Tables 1-8 were indicated as a mass ratio of the sample to pure water which has the same volume as the sample under 101.325 kPa (standard atmospheric pressure) at 4° C. and measured under the method conformed to "Measuring method weighing in liquid", JIS Z 8807 (1976).

Evaluation of devitrification resistance of each sample described in Tables 1-8 were visually confirmed the presence or absence of devitrification, after about 20 g of glass was held at the temperature equal to or above the liquid phase temperature (equal to or more than 1150° C.) for a given length of time to melt, and cooled to the temperature equal to or below the glass-transition temperature (equal to or less than 300° C.) at 200° C./h of the reduction rate in temperature.

Incidentally, the description of "unmeasurable" indicates that it was impossible to measure (i.e., use as optical glass), due to partial devitrification of the glass, introduction of bubbles into the glass and the like, when the glass was manufactured. Also, the description of "not performed" indicates that it was not necessary to measure and evaluate, due to complete devitrification of the glass when the glass was manufactured.

TABLE 1

|  | Example 1 | Example 2 | Example 3 | Example 4 | Example 5 | Example 6 | Example 7 |
|---|---|---|---|---|---|---|---|
| $B_2O_3$ | 12.17 | 11.00 | 12.26 | 12.68 | 12.25 | 12.01 | 18.03 |
| $P_2O_5$ | 42.23 | 45.53 | 44.72 | 44.36 | 44.68 | 41.68 | 41.14 |
| $Al_2O_3$ | 1.79 | 1.93 | 1.76 | 1.88 | 1.76 | 1.77 | 2.20 |
| $Li_2O$ | 3.40 | 4.39 | 4.48 | 4.27 | 4.47 | 3.36 | 4.21 |
| MgO | 3.28 | 2.51 | 2.56 | 2.45 | 2.56 | 3.24 | 3.20 |
| CaO |  | 1.43 | 1.19 | 1.39 | 1.19 |  |  |
| SrO | 7.54 | 4.97 | 1.98 | 1.92 | 1.99 | 7.44 | 7.45 |
| BaO | 25.68 | 28.25 | 29.63 | 29.69 | 29.60 | 25.34 | 23.77 |
| $Na_2O$ |  |  |  |  |  |  |  |
| $K_2O$ | 0.98 |  |  |  |  |  |  |
| ZnO |  |  |  |  |  | 2.27 |  |
| $Y_2O_3$ |  |  |  |  | 1.51 |  |  |
| $Gd_2O_3$ | 2.93 |  | 1.41 | 1.36 |  | 2.90 |  |
| $La_2O_3$ |  |  |  |  |  |  |  |
| $SiO_2$ |  |  |  |  |  |  |  |
| $Sb_2O_3$ |  |  |  |  |  |  |  |
| Total | 100.00 | 100.00 | 100.00 | 100.00 | 100.00 | 100.00 | 100.00 |
| MgO + CaO | 3.28 | 3.94 | 3.75 | 3.84 | 3.74 | 3.24 | 3.20 |
| $Y_2O_3 + Gd_2O_3$ | 2.93 | 0.00 | 1.41 | 1.36 | 1.51 | 2.90 | 0.00 |
| nd | 1.59354 | 1.58980 | 1.59167 | 1.59189 | 1.59229 | 1.59843 | 1.58536 |
| vd | 66.76 | 67.48 | 67.16 | 67.26 | 67.00 | 66.42 | 67.52 |
| Tg (° C.) | 510 | 491 | 496 | 497 | 495 | 509 | 492 |
| Tl (° C.) | 980 | 880 | 850 | 840 | 950 | 980 | 950 |
| Sg | 3.34 | 3.25 | 3.27 | 3.27 | 3.26 | 3.38 | 3.17 |
| devitrification resistance | no devitrification | no devitrification | no devitrification | no devitrification | no devitrification | no devitrification | no devitrification |

TABLE 2

|  | Example 8 | Example 9 | Example10 | Example11 | Example12 | Example13 | Example14 |
|---|---|---|---|---|---|---|---|
| $B_2O_3$ | 11.88 | 14.71 | 11.03 | 11.04 | 11.13 | 18.93 | 11.73 |
| $P_2O_5$ | 43.32 | 49.27 | 45.66 | 45.70 | 46.08 | 36.29 | 40.73 |
| $Al_2O_3$ | 1.71 | 1.67 | 1.93 | 1.93 |  | 0.66 | 0.80 |
| $Li_2O$ | 4.34 | 5.54 | 1.51 | 1.51 | 5.17 | 6.16 | 4.45 |
| MgO |  | 3.06 | 3.55 | 3.55 | 2.54 | 3.18 |  |
| CaO | 3.91 |  |  |  | 1.45 |  | 3.93 |
| SrO | 1.93 | 1.80 | 4.98 | 4.99 | 5.03 | 1.87 |  |
| BaO | 31.54 | 23.95 | 28.34 | 28.36 | 28.60 | 32.91 | 35.52 |
| $Na_2O$ |  |  | 3.00 |  |  |  |  |
| $K_2O$ |  |  |  | 2.92 |  |  |  |
| ZnO |  |  |  |  |  |  |  |
| $Y_2O_3$ |  |  |  |  |  |  |  |

TABLE 2-continued

|  | Example 8 | Example 9 | Example10 | Example11 | Example12 | Example13 | Example14 |
|---|---|---|---|---|---|---|---|
| $Gd_2O_3$ | 1.38 |  |  |  |  |  | 2.84 |
| $La_2O_3$ |  |  |  |  |  |  |  |
| $SiO_2$ |  |  |  |  |  |  |  |
| $Sb_2O_3$ |  |  |  |  |  |  |  |
| Total | 100.00 | 100.00 | 100.00 | 100.00 | 100.00 | 100.00 | 100.00 |
| MgO + CaO | 3.91 | 3.06 | 3.55 | 3.55 | 3.99 | 3.18 | 3.93 |
| $Y_2O_3 + Gd_2O_3$ | 1.38 | 0.00 | 0.00 | 0.00 | 0.00 | 0.00 | 2.84 |
| nd | 1.59632 | 1.57785 | 1.58365 | 1.58044 | 1.58996 | 1.59246 | 1.60286 |
| vd | 66.84 | 68.44 | 67.60 | 67.95 | 67.31 | 66.22 | 66.07 |
| Tg (° C.) | 490 | 479 | 511 | 529 | 471 | 481 | 489 |
| Tl (° C.) | 860 | 780 | 880 | 840 | 880 | 940 | 940 |
| Sg | 3.32 | 3.07 | 3.29 | 3.26 | 3.26 | 3.23 | 3.42 |
| devitrification resistance | no devitrification | no devitrification | no devitrification | no devitrification | no devitrification | no devitrification | no devitrification |

TABLE 3

|  | Example15 | Example16 | Example17 | Example18 | Example19 | Example20 | Example21 |
|---|---|---|---|---|---|---|---|
| $B_2O_3$ | 17.57 | 12.65 | 11.16 | 11.18 | 17.40 | 11.26 | 12.15 |
| $P_2O_5$ | 47.49 | 44.27 | 46.23 | 46.28 | 47.01 | 42.38 | 44.29 |
| $Al_2O_3$ |  | 0.90 |  |  |  |  | 1.74 |
| $Li_2O$ | 5.34 | 4.27 | 2.30 | 2.24 | 5.28 | 4.56 | 4.44 |
| MgO | 2.95 | 1.29 | 3.59 | 3.59 | 2.92 |  | 2.54 |
| CaO |  | 1.39 |  |  |  | 1.14 | 1.18 |
| SrO | 1.73 | 1.91 | 5.04 | 5.05 | 1.71 |  | 1.97 |
| BaO | 23.08 | 29.64 | 28.70 | 28.71 | 22.85 | 34.11 | 29.34 |
| $Na_2O$ |  |  | 2.97 |  |  |  |  |
| $K_2O$ | 1.83 |  |  | 2.95 | 1.82 |  | 0.45 |
| ZnO |  | 2.33 |  |  |  | 3.82 |  |
| $Y_2O_3$ |  |  |  |  |  |  |  |
| $Gd_2O_3$ |  | 1.35 |  |  |  | 2.73 | 1.41 |
| $La_2O_3$ |  |  |  |  |  |  |  |
| $SiO_2$ |  |  |  |  | 1.00 |  | 0.50 |
| $Sb_2O_3$ |  |  |  |  |  |  |  |
| Total | 100.00 | 100.00 | 100.00 | 100.00 | 100.00 | 100.00 | 100.00 |
| MgO + CaO | 2.95 | 2.67 | 3.59 | 3.59 | 2.92 | 1.14 | 3.71 |
| $Y_2O_3 + Gd_2O_3$ | 0.00 | 1.35 | 0.00 | 0.00 | 0.00 | 2.73 | 1.41 |
| nd | 1.57313 | 1.59375 | 1.58278 | 1.58008 | 1.57173 | 1.58804 | 1.58942 |
| vd | 68.61 | 66.91 | 67.60 | 67.88 | 68.58 | 64.18 | 67.32 |
| Tg (° C.) | 471 | 483 | 482 | 498 | 476 | 462 | 489 |
| Tl (° C.) | 760 | 870 | 870 | 830 | 910 | 920 | 890 |
| Sg | 3.02 | 3.30 | 3.28 | 3.25 | 3.01 | 3.44 | 3.25 |
| devitrification resistance | no devitrification | no devitrification | no devitrification | no devitrification | no devitrification | no devitrification | no devitrification |

TABLE 4

|  | Example22 | Example23 | Example24 | Example25 | Example26 | Example27 | Example28 |
|---|---|---|---|---|---|---|---|
| $B_2O_3$ | 15.07 | 15.73 | 15.60 | 19.33 | 13.65 | 14.69 | 15.37 |
| $P_2O_5$ | 46.61 | 48.62 | 48.24 | 46.02 | 45.09 | 45.43 | 47.53 |
| $Al_2O_3$ | 2.80 | 2.92 | 2.90 | 2.81 | 2.96 | 2.73 | 2.85 |
| $Li_2O$ | 2.05 | 2.14 | 2.12 | 2.06 | 2.17 | 2.00 | 2.09 |
| MgO | 3.54 | 3.69 | 3.66 | 3.56 |  | 3.45 | 3.61 |
| CaO |  |  |  |  | 3.53 |  |  |
| SrO |  | 9.01 | 8.94 | 8.07 |  |  | 8.81 |
| BaO | 27.53 | 15.38 | 15.26 | 15.75 | 29.14 | 26.83 | 15.04 |
| $Na_2O$ | 2.40 | 2.50 | 0.95 | 2.41 | 0.78 | 2.34 | 0.94 |
| $K_2O$ |  |  | 2.32 |  | 2.67 |  | 2.29 |
| ZnO |  |  |  |  |  |  |  |
| $Y_2O_3$ |  |  |  |  |  |  |  |
| $Gd_2O_3$ |  |  |  |  |  | 2.53 |  |
| $La_2O_3$ |  |  |  |  |  |  |  |
| $SiO_2$ |  |  |  |  |  |  | 1.46 |
| $Sb_2O_3$ |  |  |  |  |  |  |  |
| Total | 100.00 | 100.00 | 100.00 | 100.00 | 100.00 | 100.00 | 100.00 |
| MgO + CaO | 3.54 | 3.69 | 3.66 | 3.56 | 3.53 | 3.45 | 3.61 |
| $Y_2O_3 + Gd_2O_3$ | 0.00 | 0.00 | 0.00 | 0.00 | 0.00 | 2.53 | 0.00 |
| nd | 1.57569 | 1.57070 | 1.56813 | 1.56870 | 1.57948 | 1.57905 | 1.56589 |

TABLE 4-continued

|  | Example22 | Example23 | Example24 | Example25 | Example26 | Example27 | Example28 |
|---|---|---|---|---|---|---|---|
| νd | 68.27 | 68.78 | 68.93 | 68.52 | 67.93 | 67.87 | 68.78 |
| Tg (° C.) | 513 | 510 | 511 | 506 | 509 | 518 | 509 |
| Tl (° C.) | 930 | 960 | 920 | 920 | 930 | 920 | 920 |
| Sg | 3.14 | 3.05 | 3.03 | 3.01 | 3.19 | 3.19 | 3.01 |
| devitrification resistance | no devitrification | no devitrification | no devitrification | no devitrification | no devitrification | no devitrification | no devitrification |

TABLE 5

|  | Example29 | Example30 | Example31 | Example32 | Example33 | Example34 |
|---|---|---|---|---|---|---|
| $B_2O_3$ | 10.80 | 14.74 | 12.15 | 11.93 | 10.49 | 10.23 |
| $P_2O_5$ | 46.06 | 45.58 | 42.17 | 44.91 | 48.82 | 51.60 |
| $Al_2O_3$ | 2.77 | 2.74 | 1.79 |  | 2.69 | 2.44 |
| $Li_2O$ | 7.30 | 7.23 | 3.39 | 4.55 | 1.97 | 1.79 |
| MgO | 3.50 | 3.46 | 3.28 |  | 3.40 | 3.08 |
| CaO |  |  |  | 1.21 |  |  |
| SrO |  | 7.84 | 7.53 |  |  |  |
| BaO | 27.20 | 15.31 | 25.64 | 22.81 | 26.44 | 23.96 |
| $Na_2O$ | 2.37 | 0.90 |  | 0.60 |  | 6.91 |
| $K_2O$ |  | 2.19 | 0.98 |  | 6.19 |  |
| ZnO |  |  |  | 11.10 |  |  |
| $Y_2O_3$ |  |  |  |  |  |  |
| $Gd_2O_3$ |  |  | 2.93 | 2.90 |  |  |
| $La_2O_3$ |  |  |  |  |  |  |
| $SiO_2$ |  |  |  |  |  |  |
| $Sb_2O_3$ |  |  | 0.15 |  |  |  |
| Total | 100.00 | 100.00 | 100.00 | 100.00 | 100.00 | 100.00 |
| MgO + CaO | 3.50 | 3.46 | 3.28 | 1.21 | 3.40 | 3.08 |
| $Y_2O_3 + Gd_2O_3$ | 0.00 | 0.00 | 2.93 | 2.90 | 0.00 | 0.00 |
| nd | 1.58000 | 1.57255 | 1.59366 | 1.59497 | 1.56488 | 1.56322 |
| νd | 67.22 | 67.85 | 66.75 | 65.18 | 68.45 | 68.14 |
| Tg (° C.) | 450 | 452 | 510 | 437 | 497 | 478 |
| Tl (° C.) | 880 | 880 | 980 | 1000 | 910 | 860 |
| Sg | 3.12 | 2.99 | 3.34 | 3.31 | 3.08 | 3.07 |
| devitrification resistance | no devitrification | no devitrification | no devitrification | no devitrification | no devitrification | no devitrification |

TABLE 6

|  | Comparative example 1 | Comparative example 2 | Comparative example 3 | Comparative example 4 | Comparative example 5 | Comparative example 6 | Comparative example 7 |
|---|---|---|---|---|---|---|---|
| $B_2O_3$ | 8.80 |  | 18.75 | 18.89 | 28.40 | 11.84 | 17.89 |
| $P_2O_5$ | 45.20 | 52.63 | 44.64 | 43.11 | 34.22 | 41.10 | 34.29 |
| $Al_2O_3$ | 2.60 | 2.02 | 5.71 | 2.30 | 3.03 | 1.74 | 0.63 |
| $Li_2O$ | 1.50 | 1.01 | 2.00 | 4.41 | 2.22 | 3.31 | 11.17 |
| MgO | 1.70 |  | 3.45 | 3.35 | 3.84 | 3.19 | 2.60 |
| CaO | 2.40 | 5.06 |  |  |  |  | 0.56 |
| SrO | 4.50 | 1.01 | 7.83 | 17.75 | 8.70 | 7.34 | 1.76 |
| BaO | 29.70 | 3.34 | 15.28 | 10.20 | 16.99 | 25.00 | 31.10 |
| $Na_2O$ |  | 2.53 | 2.34 |  | 2.60 |  |  |
| $K_2O$ |  |  |  |  |  | 0.95 |  |
| ZnO | 1.20 | 30.36 |  |  |  |  |  |
| $Y_2O_3$ |  |  |  |  |  |  |  |
| $Gd_2O_3$ |  | 2.02 |  |  |  | 5.53 |  |
| $La_2O_3$ | 2.40 |  |  |  |  |  |  |
| $SiO_2$ |  |  |  |  |  |  |  |
| $Sb_2O_3$ |  |  |  |  |  |  |  |
| Total | 100.00 | 100.00 | 100.00 | 100.00 | 100.00 | 100.00 | 100.00 |
| MgO + CaO | 4.10 | 5.06 | 3.45 | 3.35 | 3.84 | 3.19 | 3.16 |
| $Y_2O_3 + Gd_2O_3$ | 0.00 | 2.02 | 0.00 | 0.00 | 0.00 | 5.53 | 0.00 |
| nd | 1.59779 | 1.58984 | unmeasurable | 1.58049 | 1.56810 | 1.59681 | — |
| νd | 66.51 | 61.15 | unmeasurable | 68.12 | 66.80 | 66.50 | — |
| Tg (° C.) | 539 | 392 | 507 | 507 | 505 | 511 | — |
| Tl (° C.) | 1020 | 890 | 1190 | 1050 | 990 | 1090 | — |
| Sg | 3.41 | 3.31 | 2.98 | 3.06 | 2.96 | 3.38 | — |
| devitrification resistance | devitrification | devitrification | devitrification | devitrification | devitrification | no devitrification | not performed |

TABLE 7

|  | Comparative example 8 | Comparative example 9 | Comparative example 10 | Comparative example 11 | Comparative example 12 | Comparative example 13 | Comparative example 14 |
|---|---|---|---|---|---|---|---|
| $B_2O_3$ | 11.51 | 12.04 | 10.88 | 8.90 | 8.92 | 23.79 | 8.22 |
| $P_2O_5$ | 39.97 | 41.77 | 33.33 | 60.49 | 45.70 | 27.44 | 49.44 |
| $Al_2O_3$ |  | 1.77 | 1.40 | 2.48 | 2.63 | 3.46 | 3.02 |
| $Li_2O$ | 4.67 | 3.36 | 3.30 | 1.67 | 1.52 | 3.24 | 2.22 |
| MgO |  | 3.24 |  | 2.10 | 2.43 | 1.80 | 2.01 |
| CaO | 3.86 |  |  |  | 1.45 |  |  |
| SrO |  | 7.46 |  |  | 4.56 | 12.66 | 8.67 |
| BaO | 34.87 | 25.40 | 51.09 | 22.41 | 30.09 | 24.71 | 23.82 |
| $Na_2O$ |  |  |  | 1.95 |  | 2.91 | 2.59 |
| $K_2O$ |  | 0.97 |  |  |  |  |  |
| ZnO |  |  |  |  |  |  |  |
| $Y_2O_3$ | 5.12 |  |  |  |  |  |  |
| $Gd_2O_3$ |  | 2.90 |  |  |  |  |  |
| $La_2O_3$ |  | 1.09 |  |  | 2.71 |  |  |
| $SiO_2$ |  |  |  |  |  |  |  |
| $Sb_2O_3$ |  |  |  |  |  |  |  |
| Total | 100.00 | 100.00 | 100.00 | 100.00 | 100.00 | 100.00 | 100.00 |
| MgO + CaO | 3.86 | 3.24 | 0.00 | 2.10 | 3.88 | 1.80 | 2.01 |
| $Y_2O_3$ + $Gd_2O_3$ | 5.12 | 2.90 | 0.00 | 0.00 | 0.00 | 0.00 | 0.00 |
| nd | — | 1.59546 | — | unmeasurable | 1.59537 | 1.58839 | 1.57979 |
| vd | — | 66.70 | — | unmeasurable | 66.93 | 64.75 | 67.78 |
| Tg (° C.) | — | 511 | — | 463 | 542 | 485 | 490 |
| Tl (° C.) | — | 1060 | — | 1090 | 1040 | 970 | 1000 |
| Sg | — | 3.36 | — | 2.95 | 3.39 | 3.23 | 3.24 |
| devitrification resistance | not performed | devitrification | not performed | devitrification | devitrification | devitrification | devitrification |

TABLE 8

|  | Comparative example 15 | Comparative example 16 | Comparative example 17 | Comparative example 18 | Comparative example 19 | Comparative example 20 |
|---|---|---|---|---|---|---|
| $B_2O_3$ | 19.73 | 20.86 | 23.06 | 8.51 | 11.65 | 24.76 |
| $P_2O_5$ | 46.98 | 49.66 | 28.50 | 49.43 | 49.69 | 48.51 |
| $Al_2O_3$ | 2.87 | 3.04 | 2.95 | 2.97 | 2.98 | 3.92 |
| $Li_2O$ |  | 2.23 | 2.76 | 2.18 |  | 4.40 |
| MgO | 3.63 | 3.84 | 2.50 | 3.24 | 3.77 | 3.98 |
| CaO |  |  |  |  |  |  |
| SrO | 8.24 | 8.71 |  |  |  |  |
| BaO | 16.08 | 9.07 | 37.02 | 31.13 | 29.35 | 9.69 |
| $Na_2O$ | 2.46 | 2.60 | 3.23 | 2.54 | 2.56 | 4.75 |
| $K_2O$ |  |  |  |  |  |  |
| ZnO |  |  |  |  |  |  |
| $Y_2O_3$ |  |  |  |  |  |  |
| $Gd_2O_3$ |  |  |  |  |  |  |
| $La_2O_3$ |  |  |  |  |  |  |
| $SiO_2$ |  |  |  |  |  |  |
| $Sb_2O_3$ |  |  |  |  |  |  |
| Total | 100.00 | 100.00 | 100.00 | 100.00 | 100.00 | 100.00 |
| MgO + CaO | 3.63 | 3.84 | 2.50 | 3.24 | 3.77 | 3.98 |
| $Y_2O_3$ + $Gd_2O_3$ | 0.00 | 0.00 | 0.00 | 0.00 | 0.00 | 0.00 |
| nd | 1.56205 | 1.55909 | 1.58816 | 1.57860 | 1.56985 | 1.54709 |
| vd | 68.60 | 69.10 | 64.90 | 67.68 | 68.04 | 68.63 |
| Tg (° C.) | 565 | 503 | 492 | 497 | 565 | 469 |
| Tl (° C.) | 1000 | 930 | 970 | 1010 | 1000 | 1030 |
| Sg | 2.99 | 2.87 | 3.27 | 3.24 | 3.17 | 2.70 |
| devitrification resistance | devitrification | devitrification | devitrification | devitrification | devitrification | devitrification |

As shown in tables 1-5, it was found that all the examples of the present invention have the refractive index (nd) in the range of 1.56-1.61, the Abbe's number (vd) in the range of 63-70, the glass-transition temperature (Tg) which is equal to or less than 530° C., and the liquid phase temperature (Tl) which is equal to or less than 1000° C. Further, in the result of evaluation of devitrification resistance, devitrification could not be found in any composition.

(1) Comparative Example 1

The glass containing $La_2O_3$ in comparative example 1 had the high glass-transition temperature (Tg) that was 539° C. and the high liquid phase temperature (Tl) that was 1020° C., and devitrification was seen in evaluation of devitrification resistance.

(2) Comparative Example 2

In comparative example 2 in which CaO was contained in more than 4%, BaO was contained in less than 10%, and ZnO was contained in more than 12%, the Abbe's number (vd) was low that was 61.15 and devitrification was seen in evaluation of devitrification resistance.

(3) Comparative Example 3

In comparative example 3 in which $Al_2O_3$ was contained in more than 5%, devitrification was seen in a part of the resulting glass, therefore, it was impossible to measure (usage as optical glass).

(4) Comparative Example 4

In comparative example 4 in which SrO was contained in more than 15%, the liquid phase temperature (Tl) was high that was 1050° C., and devitrification was seen in evaluation of devitrification resistance.

(5) Comparative Example 5

In comparative example 5 in which $B_2O_3$ was contained in more than 25%, devitrification was seen in evaluation of devitrification resistance.

(6) Comparative Example 6

In comparative example 6 in which $Gd_2O_3$ was contained in more than 5%, the liquid phase temperature (Tl) was high that was 1090° C.

(7) Comparative Example 7

In comparative example 7 in which $Li_2O$ was contained in more than 10%, the resulting glass was devitrified completely.

(8) Comparative Example 8

In comparative example 8 in which $Y_2O_3$ was contained in more than 5%, the resulting glass was devitrified completely.

(9) Comparative Example 9

In comparative example 9 containing $La_2O_3$, the liquid phase temperature (Tl) was high that was 1060° C., and devitrification was seen in evaluation of devitrification resistance.

(10) Comparative Example 10

In comparative example 10 in which BaO was contained in more than 50%, the resulting glass was devitrified completely.

(11) Comparative Example 11

In comparative example 11 in which $P_2O_5$ was contained in more than 60%, devitrification was seen in evaluation of devitrification resistance. Further, it was impossible to use it as optical glass due to introduction of bubbles into the glass.

(12) Comparative Example 12

In comparative example 12 containing $La_2O_3$, the glass-transition temperature (Tg) was high that was 542° C. and the liquid phase temperature (Tl) was high that was 1040° C., and devitrification was seen in evaluation of devitrification resistance.

(13) Comparative Example 13

In comparative example 13 in which $P_2O_5$ was less than 30%, devitrification was seen in evaluation of devitrification resistance.

(14) Comparative Example 14

In comparative example 14 in which $B_2O_3$ was less than 10%, devitrification was seen in evaluation of devitrification resistance.

(15) Comparative Example 15

In comparative example 15 not containing $Li_2O$, the glass-transition temperature (Tg) was high that was 565° C., and devitrification was seen in evaluation of devitrification resistance.

(16) Comparative Example 16

In comparative example 16 in which BaO was less than 10%, devitrification was seen in evaluation of devitrification resistance.

(17) Comparative Example 17

In comparative example 17 in which $P_2O_5$ was less than 30%, devitrification was seen in evaluation of devitrification resistance.

(18) Comparative Example 18

In comparative example 18 in which $B_2O_3$ was less than 10%, the liquid phase temperature (Tl) was high that was 1010° C., and devitrification was seen in evaluation of devitrification resistance.

(19) Comparative Example 19

In comparative example 19 not containing $Li_2O$, devitrification was seen in evaluation of devitrification resistance.

(20) Comparative Example 20

In comparative example 20 in which BaO was less than 10%, the liquid phase temperature (Tl) was high that was 1030° C., and devitrification was seen in evaluation of devitrification resistance.

As described above, phosphate glass according to the examples had optical constants of the refractive index (nd) in the range of 1.56-1.61 and the Abbe's number (vd) in the range of 63-70, as well as the low glass transition temperature (Tg), which is suitable for mold press molding, and further, the liquid phase temperature (Tl) was low, and devitrification resistance was excellent. It means that the glass according to the examples is suitable for chromatic aberration correction, and extremely useful in mold press molding or hot-molding of preforms. On the other hand, in each comparative example, devitrification was seen in sampling or in evaluation of devitrification resistance, and it was often the case that the liquid phase temperature (Tl) was high. More specifically, it meant that it was not suitable for mold press molding or hot-molding of preforms due to lack of stability.

The invention claimed is:

1. An optical glass containing the following each component, in weight %:
   10-25% of $B_2O_3$;
   30-60% of $P_2O_5$;
   0-5% of $Al_2O_3$;
   0.1-10% of $Li_2O$;
   0-15% of SrO;
   10-50% of BaO;
   0-12% of ZnO;
   0-5% of $Y_2O_3$;
   0-5% of $Gd_2O_3$;
   0-4% of MgO; and
   0-4% of CaO,
   while not containing $La_2O_3$,
   wherein a total amount of $Y_2O_3$ and $Gd_2O_3$ in the optical glass is at least 1.35 weight % and is equal to or less than 5 weight %, and
   a total amount of MgO and CaO in the optical glass is equal to or less than 4 weight %.

2. The optical glass according to claim 1, containing the following each component, in weight %:
   0-8% of $Na_2O$; and
   0-8% of $K_2O$.

3. The optical glass according to claim 1, having a refractive index (nd) in a range of 1.56-1.61, and an Abbe's number (vd) in a range of 63-70.

4. The optical glass according to claim 1, having a glass-transition temperature (Tg) equal to or less than 530° C.

5. The optical glass according to claim 1, having a liquid phase temperature (Tl) equal to or less than 1000° C.

6. The optical glass according to claim 1, wherein devitrification does not occur, when a temperature of the optical glass is cooled from equal to or more than the liquid phase temperature to equal to or less than the glass-transition temperature, at a temperature reduction rate of 200° C./h.

7. An optical element using the optical glass according to claim 1.

8. An optical device equipped with the optical element according to claim 7.

* * * * *